(12) United States Patent
Jones

(10) Patent No.: US 6,901,077 B1
(45) Date of Patent: May 31, 2005

(54) TIMESLOT INTERCHANGE CIRCUIT SUPPORTING PCM, ADPCM, AND MULTIPLE DATA CHANNEL CONNECTIVITY TO T1 AND E1 CIRCUITS

(75) Inventor: Barry W. Jones, Hoffman Estates, IL (US)

(73) Assignee: Rockwell Electronic Commerce Technologies, LLC, Wood Dale, IL (US)

( * ) Notice: Subject to any disclaimer, the term of this patent is extended or adjusted under 35 U.S.C. 154(b) by 0 days.

(21) Appl. No.: 09/511,526

(22) Filed: Feb. 23, 2000

(51) Int. Cl.⁷ ................................................ H04J 3/00
(52) U.S. Cl. ...................... 370/442; 370/458; 370/468; 370/521
(58) Field of Search ................................ 370/442, 378, 370/458, 468, 465, 477, 521, 271, 359, 363, 366–368, 375–379, 381–383, 387, 388, 463, 536, 537, 540, 544; 379/93.08, 93.01, 265.02, 266.04, 266.05

(56) References Cited

U.S. PATENT DOCUMENTS

| | | | |
|---|---|---|---|
| 3,920,916 A | * 11/1975 | Brightman et al. | ............ 199/15 |
| 4,839,888 A | * 6/1989 | Baltz et al. | ................ 370/68.1 |
| 5,268,903 A | 12/1993 | JOnes et al. | ............. 370/110.1 |
| 5,825,779 A | * 10/1998 | Putnins et al. | .............. 370/477 |
| 5,841,771 A | * 11/1998 | Irwin et al. | ................ 370/360 |
| 5,862,136 A | * 1/1999 | Irwin | ......................... 370/395 |
| 6,046,994 A | 4/2000 | Fechalos et al. | ............ 370/366 |

* cited by examiner

Primary Examiner—Alpus H. Hsu
Assistant Examiner—Justin M. Philpott
(74) Attorney, Agent, or Firm—Welsh & Katz, Ltd.

(57) ABSTRACT

A method and apparatus are provided for exchanging information between at least some slots of a first T-carrier and some other non-coincidental slots of a second T-carrier. The method includes the steps of exchanging information between successive slots of the first T-carrier and respective predetermined memory locations within a memory device and exchanging information between successive slots of the second T-carrier and at least some of the predetermined locations in memory of the first T-carrier based upon a channel-exchange list relating at least some channels of the first T-carrier to at least some other channels of the second T-carrier.

52 Claims, 3 Drawing Sheets

TIMESLOT INTERCHANGE CIRCUIT SUPPORTING PCM, ADPCM, AND MULTIPLE DATA CHANNEL CONNECTIVITY TO T1 AND E1 CIRCUITS

FIELD OF THE INVENTION

The field of the invention relates to communication systems and more particularly to automatic call distributors.

BACKGROUND OF THE INVENTION

Automatic call distribution systems are known. Such systems are typically used in an organizational context as a means of distributing telephone calls among a group of agents of the organization. Agents are typically segregated into groups to serve particular call targets within an organization.

Often the organization disseminates a single telephone number to its customers and to the public in general as a means of contacting the organization. As calls are directed to the organization from the public switch telephone network (PSTN), the automatic call distribution system directs the calls to its agents using some assignment algorithm, typically based upon availability. For example, where all agents are considered equal, the automatic call distributor (ACD) may distribute the calls based upon which agent position (telephone) has been idle the longest.

In order to route calls, the ACD is provided with a matrix switch capable of connecting any first port to any second port of the switch. A controller of the ACD routes calls by forming connections within the matrix switch.

Incoming calls typically arrive at ports of the matrix switch through one or more trunk connections with a public switched telephone network (PSTN). Upon detecting an incoming call, the ACD may accept or reject the call. To accept the call, the controller may send an accept message over a control path to the PSTN. Upon acceptance of the call, the call is connected by the PSTN through the incoming trunk to a port of the matrix switch. Once the incoming call arrives at the switch of the ACD, any of a number of ACD system resources (e.g., an agent, a voice response unit (VRU), etc.) may be used to service the call.

For example, based upon the type of call, the controller may select an agent to service the call. Upon selecting an agent, the controller may send instructions to the matrix switch causing the port of the incoming call to be connected to a port of the selected agent.

In the alternative, where all agents are busy, the call may be placed in a queue in anticipation of the next available agent. While in the queue, a voice response unit connected to another port of the switch may be coupled to the call to present the caller with a set of options. A tone detector/voice analyzer may, in turn, detect a response from the caller. The tone detector/analyzer may be coupled to a host computer, which routes the call accordingly, depending upon the response entered.

For large organizations, an ACD may require large numbers of agents and the ability to handle a large number of calls. Further, for large organizations, it may be necessary to staff agent positions from 8 am, New York time to 6 p.m. San Diego time. However, in some locals, it is difficult to recruit sufficient numbers of agents or provide adequate supervision or training.

Further, as ACDs are currently constructed, it is difficult to position agents any more than 1,000 meters from the switch of the ACD. Where longer distances are required, channel bank or multiplexer boxes and the use of private lines may be used to support ACD system resources (e.g., agent centers) at remote locations.

While channel bank or multiplexer boxes are effective, they are: a) limited to a dedicated functionality, or b) require a complex architecture/implementation to support a sufficient range of functionality. For example, where a channel bank box or multiplexer box is provided for analog circuits, that box may be limited to analog circuits. Because of the importance of ACDs, a need exists for a simpler means of locating and operating the functional resources of ACD systems from remote locations.

Further, where resources are located at remote locations, the connections to such resources may each include a high-speed (e.g., T1/E1) interface, that may be less than fully loaded. The use of lightly loaded interfaces is inefficient and a waste of communication resources. Accordingly, a further need exists for a means of consolidating data streams from multiple resources into one or more information channels forming an interconnect between an ACD and the remote locations.

SUMMARY

A method and apparatus are provided for exchanging information between at least some slots of a first T-carrier and some other non-coincidental slots of a second T-carrier. The method includes the steps of exchanging information between successive slots of the first T-carrier and respective predetermined memory locations within a memory device and exchanging information between successive slots of the second T-carrier and at least some of the predetermined locations in memory of the first T-carrier based upon a channel-exchange list relating at least some channels of the first T-carrier to at least some other channels of the second T-carrier.

DETAILED DESCRIPTION OF A PREFERRED EMBODIMENT

Figure 1:
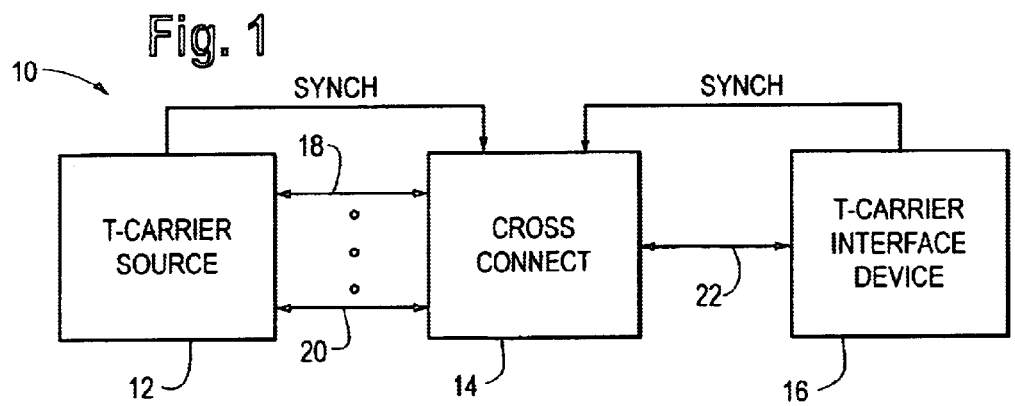
FIG. 1 is a block diagram of a cross-connect system in accordance with an illustrated embodiment of the invention.

FIG. 1 is a block diagram of a communication system 10, including a cross-connect concentrator 14 shown in a context of use under an illustrated embodiment of the invention. As shown, the cross-connect concentrator 14 may be disposed between a number of T-carriers provided on connections 18, 20 on a first side and a single second T-carrier provided on connection 22 on a second side.

Alternatively, the concentrator 14 may be disposed between any number of T-carriers on each side. Where the concentrator 14 is disposed between a number of T-carriers on each side, it should be understood that the information of at least some channels on each T-carrier on any one side are exchanged between other channels of two or more T-carriers on an opposing side of the =concentrator 14.

As used herein a T-carrier may refer to any recognized carrier format (e.g., T1–T4, DS1–DS4, E1–E4, etc.).

Additionally, any combination of n channels (where n≧1 and each channel has a data rate of at least 64 kbps) may be considered a T-carrier. Further, as used herein a channel of a T-carrier may be used to refer to information or an information stream contained in any particular slot (or group of slots) of the T-carrier.

The composition of the connections on each side of the concentrator 14 can vary widely. For example, some of the connections 18, 20 could be for 1.544 Mbps data (e.g., PCM), while other connections 18, 20 could be entirely made up of control information associated with another connection.

For instance, the connections 18, 20 may be first and second 1.544 Mbps data streams, which may originate from an internal data (i.e., PCM) bus of an automatic call distributor (ACD). The control information may represent an output of a separate control bus of the ACD and be intended as controlling information for routing the first and second streams of PCM data. Such an arrangement may be used to interface the ACD to a voice response unit (VRU) located remotely through a T1 connection 22.

As a further alternative, the concentrator 14 of FIG. 1 may represent an interface located proximate a public switched telephone network (PSTN) central office (CO). Such an interface may be used where subscribers 18, 20 of the CO use T1 connections between the individual subscribers and CO, but may only use a few channels of the T1 carrier of the connections 18, 20. In such a case, the concentrator 14 may be used to combine channels of the individual T1 connections 18, 20 into a more densely packed T1 structure on a second connection 22.

Figure 2:
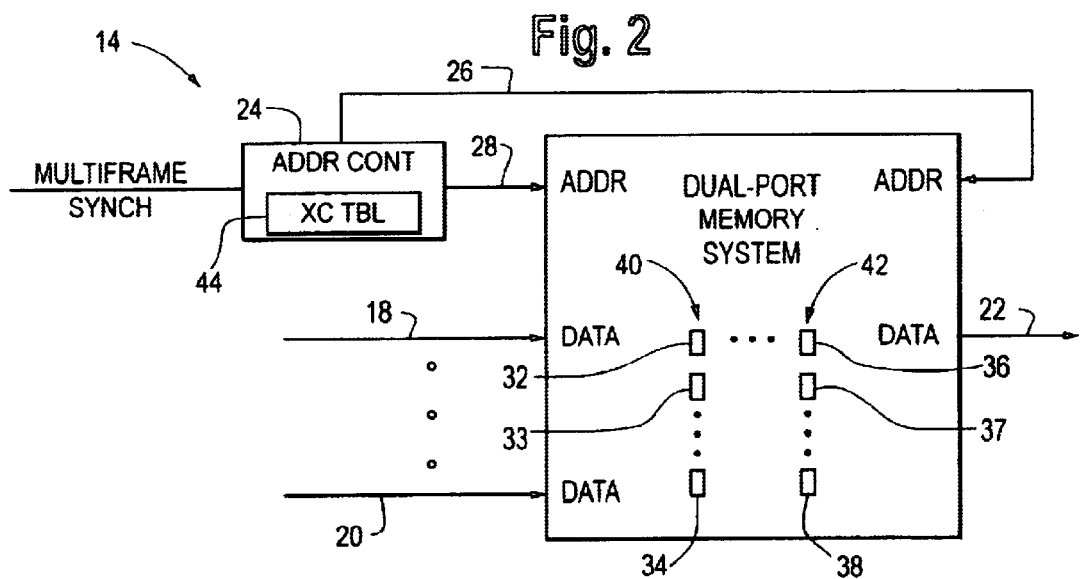
FIG. 2 is a block diagram of a cross-connect concentration of the system of FIG. 1.
Figure 4:
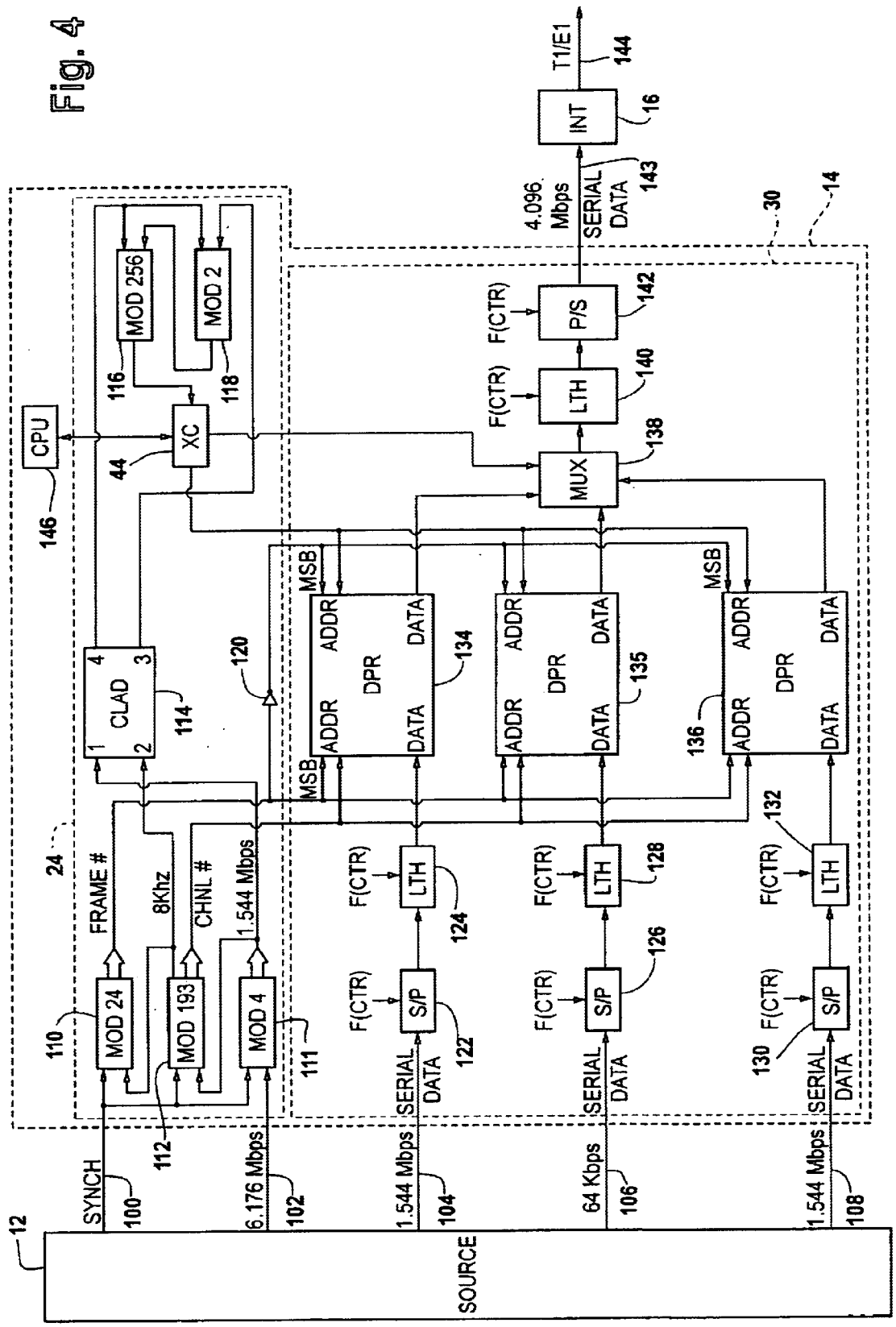
FIG. 4 is a simplified version of the system of FIG. 1.

For convenience, data traveling from left to right in FIGS. 1, 2 and 4 will normally be considered as traveling in the forward direction. Data traveling from right to left will usually be considered as traveling in the reverse direction. Further, "servicing" a channel of a T-carrier will include not only receiving data from the channel, but also inserting data into the channel for transmission in the opposite direction.

It should be noted, that the system 10 shows a SYNCH connection originating from the T-carrier SOURCE 12 and T-carrier INTERFACE 16. It should be understood that only one SYNCH connection would be required for the successful operation of the system 10. For example, where one or more subscribers represent the SOURCE 12, SYNCH would originate from the CO. Alternatively, where the SOURCE 12 is an ACD, then the ACD would provide SYNCH.

Turning now to FIG. 2, an explanation will be offered for the general case where the system 10 functions as a cross-connect concentrator between a number of T-carrier connections 18, 20, 22. For purposes of explanation and simplicity, it will be assumed that the connections 18, 20, 22 all operate under a common T1 format.

As a first example, it will be assumed that channel numbers (e.g., slots) 3, 7 and 20 of the first T-carrier 18 are to be cross-connected with channels (e.g., slots) 4, 2 and 1 of the third T-carrier 22, respectively. It will also be assumed that channel numbers 1, 3 and 18 of the second T-carrier 20 are to be cross-connected with channels 3, 21 and 22 of the third T-carrier 22.

As a first step under the illustrated example, information from the channels of a first and second sets of T-carriers 18, 20 may be written into a predetermined locations 40, 42 in memory 30. Further, the predetermined locations 40, 42 may be each divided into two (odd and even) areas for purposes of storing odd and even frames of each of the T-carriers (e.g., 18, 20). The odd and even areas allows a T-carrier on one side (e.g., the left side of FIG. 2) to write into one area (e.g., the odd area) while allowing a T-carrier on an opposing side (e.g., the right side of FIG. 2) to read from another area (e.g., the even area). The odd and even areas may be further divided into transmit and receive sub-areas.

For example, where the first T-carrier 18 is a T1 carrier, odd frames may be written into a first twenty-four successive memory locations of memory space. Even frames may be written into the next twenty-four successive memory locations in memory space to provide a total memory requirement of forty-eight locations for the first T-carrier. Further, the odd and even memory spaces may be interleaved.

Similarly, the second T-carrier 20 may also be a T1 carrier, which writes odd frames into twenty-four successive memory locations of another location of the memory space and even frames into twenty-four successive memory locations in the memory space. As with the first T-carrier, the odd and even memory spaces may be interleaved.

The generation of addresses or transceiving the first and second T-carriers through their respective predetermined locations may be accomplished by an address control block 24. Segregation of odd and even frames of each T-carrier may be accomplished using a modulo 48 counter for a T1 carrier (or module 64 counter for an E1 carrier), which provides a channel pointer to each of the odd and even memory locations (e.g., pointer locations 0–23 may be the odd location for a frame, locations 24–47 may be the even location). Memory areas of the first and second T-carriers 18, 20 may be differentiated by assigning a unique number to each memory area. The unique memory area number may be used as the upper portion of the address for each of the 48 locations in its memory area.

The counter 44 may be synchronized to a channel number of the connected T-carriers by a MULTIFRAME SYNCH (f=8 KHz/2*n where n≧1) connection. The MULTIFRAME SYNCH functions to synchronize the modulo 48 counter (and predetermined address) with the current channel number of the T-carrier by setting the modulo 48 counter to 0 at a time when chnl 0 data is present on the T-carrier. The counter will then increment at the rate that channels arrive on the T-carrier and reflect the number of the current channel on the T-carrier.

The two-way exchange of information (i.e., in the forward and reverse direction) between a T-carrier and memory may be accomplished by use of the same memory structure 30. For instance, data may be written (in the forward direction) from a first channel of the first T-carrier 18 into a first memory location in memory area 32. A separate memory area may be reserved for data to be written (in the reverse direction) from memory 30 into the first channel location of the first T-carrier 18. The same type of unique number assigned to the memory area for forward direction should likewise be assigned to the memory area for the reverse direction.

Figure 3:
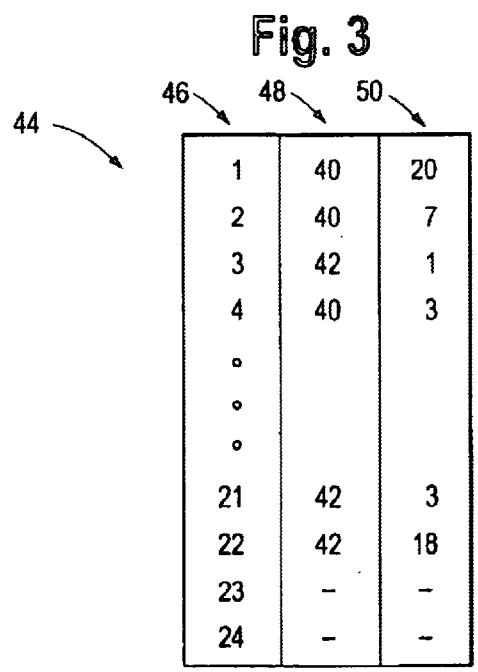
FIG. 3 is a cross-connection table that may be used by the system of FIG. 1.

Data may be cross-connected between the first and second T-carriers 18, 20 and the third T-carrier 22 based upon cross-connect information found in a channel-exchange list that may be found within a cross-connect (XC) table 44 within the address controller 24. FIG. 3 is an example of information that may be contained in the cross-connect table 44. The data of FIG. 3 relates at least some channels of a first set of T-carriers 18, 20 with at least some other channels of a second set of T-carriers 22.

To facilitate the cross-connect process, data may be exchanged between memory 30 and the third T-carrier 22 sequentially. For example, data may be exchanged on a first channel, then a second channel, a third, and so on. As with the first and second T-carriers, the third T-carrier may use a modulo forty-eight counter to keep track of channel number (and address).

Cross connecting data from memory 30 and the third T-carrier 22 may be accomplished using the XC table 44 of FIG. 3. The first column 46 of the XC table 44 may be a channel number Of the third T-carrier 22. The second column may be used to identify a memory area of the cross-connected T-carrier 18, 20. The third column 50 may be used to identify the channel of the cross-connected T-carrier 18, 20.

The XC table 44 may be entered (FIG. 3) using a channel number of the third T-carrier shown in the left column 46. For example, when the first channel of the third T-carrier 22 is processed, the address of channel 20 of the first T-carrier 18 is retrieved. For the second channel of the third T-carrier, the address of channel 7 of the first T-carrier is retrieved. For the third channel of the third T-carrier, the address of channel 1 of the second T-carrier is retrieved.

As the addresses are retrieved, information is exchanged between the third T-carrier and the appropriate memory locations. For example, when it becomes time to service the first channel of the third T-carrier, information from the first channel of the third T-carrier may be written into the memory location of the twentieth channel of the first T-carrier (reverse direction). Information from the twentieth channel of the first T-carrier 18 is written into the first channel of the third T-carrier (forward direction), etc.

FIG. 4 is a simplified block diagram of a concentrator 14 that may cross-connect a number of T-carriers of a source 12 such as a ACD with a single T-carrier for application to a T-carrier interface device 16. The T-carrier interface 16 may be any interface device structured to drive a T-carrier transmission medium (e.g., a Conexant BT8370, Sierra/PMC PM4351, etc.). The output of the T-carrier interface 16 may be provided as a trunk interface to the PSTN, another ACD, etc.

The concentrator 14 of FIG. 4 is an example of a circuit that may be used for data flow in the forward direction. Data flow in the reverse direction may be accomplished through the use of a substantially identical circuit.

As shown in FIG. 4 a number of clock signals are provided to the concentrator 14. One signal on a first connection 100 may be a synch signal provided once every multiframe. The second signal on a second connection 102 may be a 6.176 Mbps clock at a rate four times that of the T1 source. While the clock inputs 100, 102 to the concentrator 14 are shown as explicitly provided to the concentrator 14 of FIG. 4, they may be easily derived from a T1 carrier using any of a number of commercially available circuits.

Within the block diagram of FIG. 4, the clock inputs 100, 102 to the concentrator 14 are provided as inputs to the SYNCH circuit 24 and used for address generation and to derive other related clocks. As a first step, the 6.176 Mbps clock is applied to a modulo 4 (MOD-4) counter 111 which derives a 1.544 Mbps clock. The output of the MOD-4 clock 111 is applied to a first input of the CLAD circuit 114 and as an input to a modulo 193 (MOD-193) counter 112.

Bits 4–8 of the MOD-193 counter are provided as lower-order address bits to dual port RAMs (DPRs) 134, 136. The highest order bit of the MOD-193 counter 112 (at 8 kHz) is provided as an input to a modulo 2xN (MOD-2N) counter 110 and as a second input to the CLAD circuit 114. Bits 4–8 of the MOD-193 counter 112 and the LSB output of the MOD-2N counter 110 together function as pointers to the predetermined memory locations of the first set of T-carriers 104, 106, 108.

The CLAD circuit 114 may be any commercially available clock rate adapter (CLAD) circuit. The CLAD circuit 114 may be used to adapt a clock rate of the input T-carriers to a clock rate (e.g., 4.096 Mbps) required by the internal bus of the interface 16.

The 4.096 Mbps clock is provided on a third, output connection of the CLAD circuit 114. An 8 kHz clock, synchronized to the 4.096 Mbps clock, is provided on the fourth, output connection to the CLAD circuit 114. The 8 kHz clock functions to identify a first channel (slot) of each frame.

The 4.096 clock is applied as an input to a modulo 2 (MOD-2) counter 118 to derive a 2.048 Mbps clock. The 2.048 clock is applied along with the 8 kHz clock to a modulo 256 (MOD-256) counter. An output of the MOD-256 counter 116 provides a slot (channel) number to the XC control 44. As described above, the XC controller 44 uses the channel numbers to provide a memory address of each cross-connected channel.

An inverter 120 is provided in the most significant bit (MSB) control connection of the memory addresses of the DPRs 134, 136. Under the illustrated example of FIG. 4, the inverter 120 functions to identify the appropriate odd and even predetermined memory addresses to (and prevent simultaneous access to the same memory locations by) the respective sides of the cross-connect concentrator 14.

To facilitate receipt of information between the T-carriers and concentrator 14, a set of serial to parallel (S/P) converters 122, 126, 130, a parallel to serial (P/S) converter 142 and latches (LTHs) 124, 128, 132, 140 are provided.

The S/P converters 122, 126, 130 may be provided with a clock state input f(CTR) depending upon the connected T-carrier. For instance, the S/P converters 122, 130 connected to the 1.544 Mbps bus may be provided with a 1.544 MHz clock state input f(CTR) which provides a transition at the instant that the input data is stable. The S/P converter 126 connected to the 64 kbps bus may be connected to a 64 kHz clock state input f(CTR). The 1.544 MHz and 64 kHz clocks may be derived from interim stages of the MOD-193 counter, with appropriate phase adjustments.

Similarly, the P/S converter 142 may also be provided with a 4.096 MHz clock state input f(CTR). The 4.096 MHz clock may be derived directly from the MOD-2 counter 118 (with phase adjustment).

The LTHs 124, 128, 132, 140 may be driven indirectly from the clock which drives the associated S/P or P/S converter. The LTHS 124, 128, 132, 140 may receive a clock input f(CTR) from a divider which provides a divided output equivalent to the number of bits processed by the LTHs 124, 128, 132, 140.

As information is received on each T-carrier connection 104, 106, 108, it is converted and latched within the associated S/P converter 122, 126, 130 and LTH 124, 128, 132. From the LTH 124, 128, 132, the forward information is transferred to a predetermined location specified by an address delivered to the address lines of the DPRs. In the case of the information delivered to interface 16, an address conversion of the cross-connected channel is performed within the XC controller 44. The converted address retrieved from the XC controller 44 may also include programming instructions for a multiplexer (MUX) 138. The programming instructions may be used to select the appropriate DPR 134, 136 depending upon the number of cross-connected T-carriers. The data retrieved from the appropriate DPR address is latched in latch 140 and transferred to P/S 142 for delivery on the 4.096 MHz output 143 to interface 16.

Also included within the concentrator 14 is a CPU 146 coupled to the XC controller 44. The CPU 146 may be used for set-up of the concentrator and for programming cross-connection paths within the XC controller 44.

Figure 5:
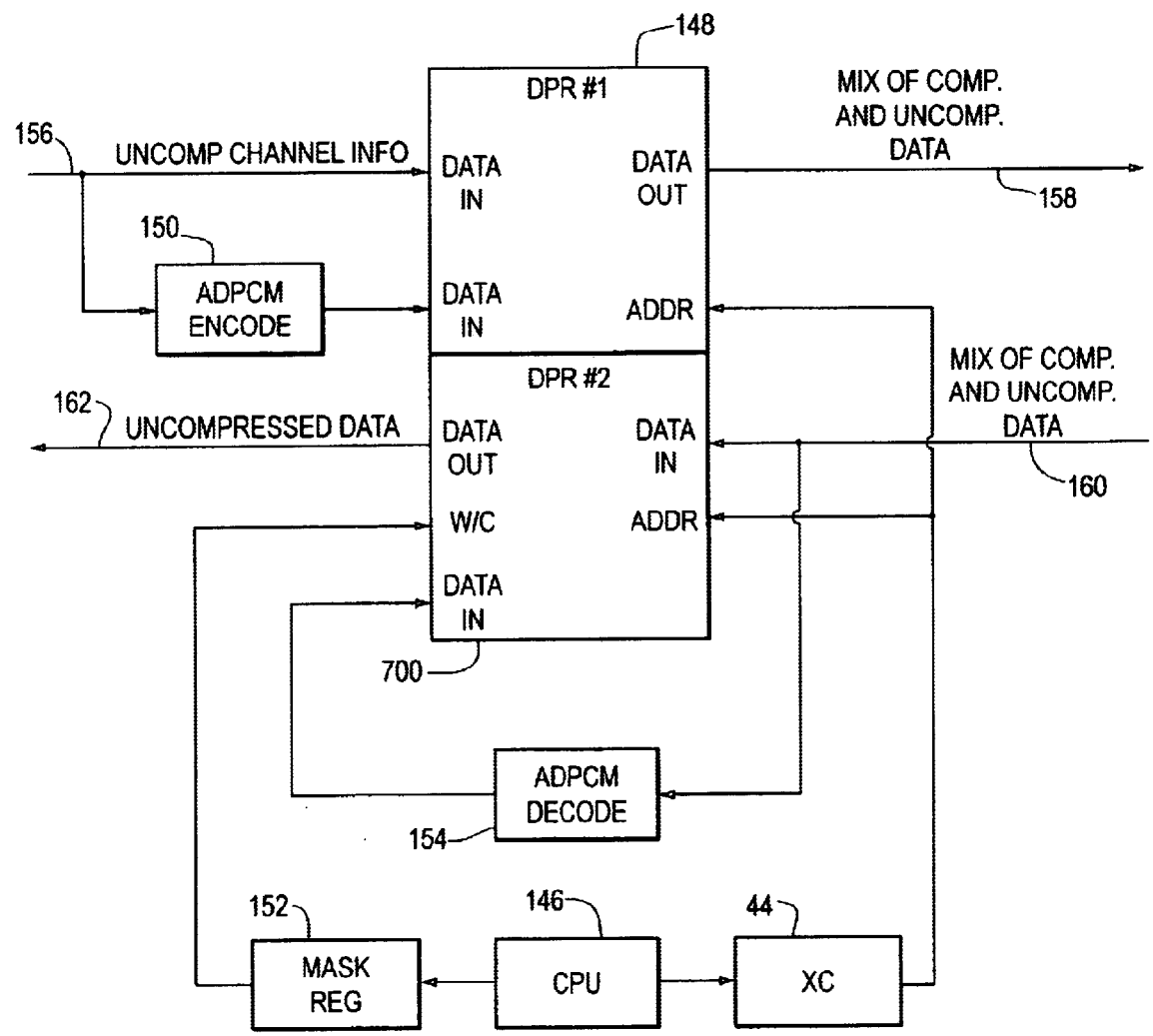
FIG. 5 is a compander that may be used by the system of FIG. 1.

FIG. 5 is a simplified block diagram of a system for compression and decompression used by the concentrator 14 of FIG. 1. Under the illustrated embodiment, data (e.g., PCM data) may be compressed (companded) or expanded (decompanded) over a two to one ratio using any commercially available ADPCM transceiver (e.g., a Conexant Model BT8110B).

The companding/decompanding process may be accomplished within the concentrator 14 as an adjunct to and independent of the cross-connect process. Selection of compressed or uncompressed channel information may be accomplished by control of the address data sent by the XC controller 44 to the DPRs 134, 136 of FIG. 4. Further, control of the companding/decompanding process and selection of channel information may be accomplished by the status of specific bit locations of addresses stored in the XC controller 44 as a part of the cross-connect information.

The compander/decompander of FIG. 5 may be used to illustrate the companding/decompanding process which may occur within the concentrator 14. The compander/decompander of FIG. 5 is shown in terms of data streams on the left suggestive of the T-carriers connections 104, 108 in FIG. 4 and data streams on the right suggestive of T-carrier connections 143 in FIG. 4. Both the forward and reverse directions are depicted in FIG. 5.

For example, in the forward direction, uncompressed data arriving from connection 104 of FIG. 4 may be provided as input 156 on FIG. 5. The arriving data may be provided as an input to the DPR 148 and also to the ADPCM encoder 150. The arriving data may be stored in the predetermined location both as received (uncompressed) and in the encoded (compressed) format. Under control of XC44, either the compressed or uncompressed form of channel data will be output 158.

Similarly in the reverse direction, data arriving from connection 143 in FIG. 4 may be provided as input 160 on FIG. 5. The arriving data may be provided as an input to the DPR 700 and also to the ADPCM decoder 154. The incoming data is stored in the DPR location dictated by XC44 presuming that it arrived in an uncompressed format. The ADPCM decoder 154, however, presumes that the data received from input 160 is compressed and decompresses that data. Should the mask register 152 bit corresponding to that channel indicate that that channel did contain compressed data, the decompressed data will overwrite that written in the DPR 700 directly from the input data 160. Should the Mask Register 152 bit corresponding to that channel indicate that the channel on input 160 did not contain compressed data, the output of the ADPCM decoder will not be used, preventing the data written into the DPR 700 directly from input data 160 from being overwritten.

It should be noted that data may always be received in an uncompressed state on input 156 and some, all or none of the channels may be compressed for transmission across the connection 22. Selection of one or more channels for compression and/or decompression may be accomplished in the forward direction by selection of the appropriate address of the compressed or uncompressed channel data within the XC 44 and forwarding of that address to the DPR 148.

Selection of either received or decoded data for each channel in the reverse direction is accomplished by the status of each bit from the mask register 152

For example, if a 24-slot frame were compressed by 50%, then the compressed data would fit into just 12 slots. Where a slot of compressed data is expanded, the expanded data inherently contains twice as much information (i.e., 2 slots worth of information).

In the preceding discussion, 2:1 compressed data received in a given channel on input 160 will actually contain data for two channels to be passed to output 162. The ADPCM decoder 154 will decompress both channel's data, storing the first extracted channel's data in DPR 700 at the address where uncompressed data from input 160 was stored, overwriting that data. The ADPCM decoder 154 will also store the second extracted channel's data in DPR 700 at the adjacent (address+1) memory location.

An addressing scheme for accessing the predetermined locations under various companding/decompanding processes will now be considered. Under the illustrated embodiment, a predetermined location may actually include several locations, each associated with a different companding/decompanding state. The XC controller 44 may function to select the appropriate predetermined location based upon a set of companding pointers associated with the cross-connected channels.

The pointers are stored within the XC table 44 and function as control words as well as addresses. The pointers generally have the format of XXXYYYYY. The XXX bit positions may function to control companding. The YYYYY bit positions may serve to identify the cross-connected channel on the right side of the concentrator of FIG. 1.

For example, XXX=000 implies that uncompressed data from 1.544 MHz data stream #1 (e.g., 104 of FIG. 4), of a particular channel (e.g., channel YYYYY=0 to 23) is to be exchanged with the interface 16. For further specificity and using the example of FIG. 3, areas 48 and 50 of the first row of FIG. 3 would contain information as follows. The first area 48 of the first row would contain XXX=000. The second area 50 would contain YYYYY=20.

Similarly, the second row of FIG. 3 would contain XXX=000 in the first area 48 and YYYYY=7 in the second area 50. The third row may use the designator XXX=001 to designate the second 1.544 MHz T-carrier 108 and YYYYY=1 to designate the first channel of the second T-carrier 108.

If the 24th channel of the first T-carrier 104 where to contain control information for insertion into the 24 channel of the cross-connected T-carrier, then the 24th row would contain XXX=000 and YYYYY=24. If the 24 channel of the second T-carrier 106 where to contain control information for insertion into the 24 channel of the cross-connected T-carrier then the 24th row would contain XXX=001 and YYYYY=24.

Implicit in the structure of the XXXYYYYY addressing is the assumption that a companding format used in the forward direction will operate in reverse in the reverse direction. If there is a one-for-one cross connection (e.g., without companding) in the forward direction, then information flowing in the reverse direction will also flow without companding. Conversely, if information is compressed in the forward direction, then it will be expanded in the reverse direction for that channel.

For example, XXX=010 will result in data on the first 1.544 MHz T-carrier 104 being compressed. Where YYYYY=0, channels 0 and 1 of the first T-carrier 104 will be compressed into channel 0 of the cross-connected T-carrier 144. Compressed information contained in channel 0 of the cross-connected T-carrier 144 will be expanded into channels 0 and 1 of the first T-carrier 104.

In order to facilitate expansion of data from the cross-connected T-carrier 144 into the cross-connect T-carrier 104, the XXX bits may be used for masking control and writing to the proper predetermined location. Expansion, in fact, may occur using a two-step process.

As a first step, the compressed data (e.g., within channel #0 of the cross-connected channel (e.g., 144 of FIG. 4) may be written into the predetermined memory location of channel #0 the first T-carrier (e.g., T-carrier 104). As a second step, the CPU 146 may determine from the XXX data for that cross-connected channel #0 of T-carrier 144 that the data is compressed. Accordingly, the CPU 146 causes the data in the predetermined location of channel #0 to be passed to the expanded 154 and masking device 152. The expanded data may then be over-written into the predetermined locations of channels #0 and #1 of the first T-carrier 104.

Using the described process, where the pointer of channel #0 of the cross-connected channel 144 were to contain XXX=010 and YYYYY=0, then data from channels #0 and #1 of the first T-carrier 104 would be compressed into channel #0 of the cross-connected T-carrier 144. (The second bit location within the XXX portion of the address may be used as a cross-connect address offset to the compressed data.) Data from channel #0 of the cross-connected T-carrier 144 would be expanded and written into channel #0 and channel #1 of the first T-carrier 104.

Similarly, where the pointer of channel #1 of the cross-connected channel 144 where to contain XXX=011 and YYYYY=0, then data from channels #0 and #1 of the second T-carrier (e.g., T-carrier 106) would be compressed into channel #0 of the cross-connected T-carrier 144. Data from channel #0 of the cross-connected T-carrier 144 would be expanded and written into channel #0 and channel #1 of the first T-carrier 106. As above, the bit status of the XXX portion of the address portion provides the appropriate cross-connect addresses.

The code XXX may be adapted for varying formats. For example, XXX=100 may be used to adapt the cross-connected T-carrier to 2.048 MHz data. The code YYYYY=0 to 32 may be used to specify a channel under such a format.

The code XXX=101 may be used to pass an idle code to or from the T1/E1 channel identified by the YYYYY code. Codes XXX=110 and 111 may also be used to pass an idle code to or from the T1/E1 channel identified by an associated YYYYY code.

The ADPCM encoders 150 and decoders 154 may be allowed to run continuously, they need not be enabled or disabled. What may be disabled in the alternative is the data path between the ADPCM decoder 154 and memory 700. Under one illustrated embodiment, the mask register 152 is disabled by the CPU 146 to prevent the ADPCM decoder 154 from over-writing data when no decompression is required. More specifically, a set of ADPCM Mask Registers 152 are provided to allow the processor 146 to dictate which channels contain uncompressed data (which the ADPCM decoder 154 shouldn't over-write in the receive dual-port memory 148) and which channels contain compressed data (which the ADPCM decoder 154 should convert to PCM and over-write) in the dual-port memory 148).

The use of dual-port RAMs 134, 136 in the receive and transmit circuits under control of a 1.544 MHz-to 4.096 MHz phase-locked loop resolves rate differences between the 1.544 MHz-based and 2.048 MHz-based data rates of the multiple I/O connections to the circuit. Such resolution of rate differences allows any combination of T-carriers to function smoothly and efficiently.

The architecture and supporting data structures of FIGS. 1–5 support a multiplicity of configurations. The process realized by the described structure is considerably more efficient than the structure of conventional approaches.

A specific embodiment of a method and apparatus for cross-connecting T-carriers according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A method of exchanging information between at least some slots of a first T-carrier and some other non-coincidental slots of a second T-carrier, such method comprising the steps of:

exchanging information between successive slots of the first T-carrier and respective predetermined memory locations within a memory device;

exchanging information between successive slots of the second T-carrier and at least some of the predetermined locations in memory of the first T-carrier based upon address data for the exchanged information provided within a channel-exchange list that relates at least some channels of the first T-carrier to at least some other channels of the second T-carrier;

determining whether the exchanged information in each successive slot should be compressed or decompressed based upon a status of specific bit locations of the respective address data for the exchanged information; and when required, compressing or decompressing the information from successive slots of the first T-carrier, wherein the step of determining whether the exchanged information should be compressed or decompressed further comprises compressing and saving the information under both compressed and uncompressed formats and selecting one of the compressed and uncompressed formats based upon the status of the specific bit locations, and wherein the step of determining whether the exchanged data should be decompressed further comprises decompressing the information and overwriting corresponding predetermined memory locations with the decompressed information when the status of the specific bit locations indicate that the corresponding predetermined memory locations contain compressed data.

2. The method of exchanging information as in claim 1 wherein the step of exchanging information between successive slots of the first T-carrier and a respective predetermined memory location within a memory device further comprises incrementing a first counter coincident with a slot progression of the first T-carrier.

3. The method of exchanging information as in claim 2 further comprising resetting the first counter upon detecting a first slot of a repeating multi-frame of the first T-carrier.

4. The method of exchanging information as in claim 3 further comprising determining the predetermined memory locations of the first T-carrier by adding an output of the first counter to a base memory address.

5. The method of exchanging information as in claim 1 further comprising retrieving the channel-exchange list from a lookup table.

6. The method of exchanging information as in claim 5 wherein the step of exchanging information between successive slots of the second T-carrier and at least some of the predetermined locations in memory of the first T-carrier based upon a channel-exchange list further comprises incrementing a second counter coincident with a slot progression of the second T-carrier.

7. The method of exchanging information as in claim 6 further comprising resetting the second counter upon detecting a first slot of a repeating multi-frame of the second T-carrier.

8. The method of exchanging information as in claim 7 further comprising determining the predetermined memory locations of the first T-carrier by adding an output of the second counter to a base memory address of the lookup table.

9. The method of exchanging information as in claim 8 further comprising retrieving a predetermined memory location of the predetermined memory locations of the first T-carrier from a lookup table memory address determined by adding the output of the second counter and the base memory address of the lookup table.

10. The method of exchanging information as in claim 1 further comprising defining the first T-carrier as a plurality of T-carriers.

11. The method of exchanging information as in claim 10 further comprising exchanging information between a plurality of first T-carriers and respective predetermined memory locations within the memory device.

12. The method of exchanging information as in claim 11 further comprising defining the second T-carrier as a plurality of T-carriers.

13. The method of exchanging information as in claim 12 further comprising coupling the second T-carrier to a T-carrier interface device.

14. The method of exchanging information as in claim 13 further comprising locating the plurality of predetermined memory locations in a plurality of memory devices.

15. The method of exchanging information as in claim 14 further comprising multiplexing information between the predetermined locations of the plurality of first T-carriers and the T-carrier interface device of the second T-carrier.

16. The method of exchanging information as in claim 1 wherein the step of compressing the information from the successive slots of the first T-carrier further comprises storing both compressed and uncompressed versions in the predetermined memory locations of the memory device.

17. The method of exchanging information as in claim 16 further comprising defining the channel-exchange list as a compression status list.

18. The method of exchanging information as in claim 1 further comprising de-compressing the information of successive slots of the first T-carrier.

19. The method of exchanging information as in claim 18 further comprising overwriting at least some of the predetermined memory locations with de-compressed data based upon a compression status list relating at least some channels of the first T-carrier to at least some other channels of the second T-carrier.

20. Apparatus for exchanging information between at least some slots of a first T-carrier and some other non-coincidental slots of a second T-carrier, such apparatus comprising:

means for exchanging information between successive slots of the first T-carrier and respective predetermined memory locations within a memory device;

means for exchanging information between successive slots of the second T-carrier and at least some of the predetermined locations in memory of the first T-carrier based upon address data for the exchanged information provided within a channel-exchange list relating at least some channels of the first T-carrier to at least some other channels of the second T-carrier;

means for determining whether the exchanged information in each successive slot should be compressed or decompressed based upon a status of specific bit locations of the respective address data for the exchanged information; and means for compressing or decompressing the information from successive slots of the first T-carrier when required by the address data, wherein the means for determining whether the exchanged information should be compressed or decompressed further comprises means for compressing and saving the information under both compressed and uncompressed formats and selecting one of the compressed and uncompressed formats based upon the status of the specific bit locations, and wherein the means for determining whether the exchanged data should be decompressed further comprises means for decompressing the information and overwriting corresponding predetermined memory locations when the status of the specific bit locations indicate that the corresponding predetermined memory locations contain compressed data.

21. The apparatus for exchanging information as in claim 20 wherein the means for exchanging information between successive slots of the first T-carrier and a respective predetermined memory location within a memory device further comprises means for incrementing a first counter coincident with a slot progression of the first T-carrier.

22. The apparatus for exchanging information as in claim 21 further comprising means for resetting the first counter upon detecting a first slot of a repeating multi-frame of the first T-carrier.

23. The apparatus for exchanging information as in claim 22 further comprising means for determining the predetermined memory locations of the first T-carrier by adding an output of the first counter to a base memory address.

24. The apparatus for exchanging information as in claim 23 further comprising means for determining the predetermined memory locations of the first T-carrier by adding an output of the second counter to a base memory address of the lookup table.

25. The apparatus for exchanging information as in claim 24 further comprising means for retrieving a predetermined memory location of the predetermined memory locations of the first T-carrier from a lookup table memory address determined by adding the output of the second counter and the base memory address of the lookup table.

26. The apparatus for exchanging information as in claim 22 further comprising means for retrieving the channel-exchange list from a lookup table.

27. The apparatus for exchanging information as in claim 26 wherein the means for exchanging information between successive slots of the second T-carrier and at least some of the predetermined locations in memory of the first T-carrier based upon a channel-exchange list further comprises means for incrementing a second counter coincident with a slot progression of the second T-carrier.

28. The apparatus for exchanging information as in claim 27 further comprising means for resetting the second counter upon detecting a first slot of a repeating multi-frame of the second T-carrier.

29. The apparatus for exchanging information as in claim 20 further comprising means for defining the first T-carrier as a plurality of T-carriers.

30. The apparatus for exchanging information as in claim 29 further comprising means for exchanging information between a plurality of first T-carriers and respective predetermined memory locations within the memory device.

31. The apparatus for exchanging information as in claim 30 further comprising means for coupling the second T-carrier to a T-carrier interface device.

32. The apparatus for exchanging information as in claim 31 further comprising means for location the plurality of predetermined memory locations in a plurality of memory devices.

33. The apparatus for exchanging information as in claim 32 further comprising means for multiplexing information between the predetermined locations of the plurality of first T-carriers and the T-carrier interface device of the second T-carrier.

34. Apparatus for exchanging information between at least some slots of a first T-carrier and some other non-coincidental slots of a second T-carrier, such apparatus comprising:
   a first address controller adapted to exchange information between successive slots of the first T-carrier and respective predetermined memory locations within a memory device;
   a second address controller adapted to exchange information between successive slots of the second T-carrier and at least some of the predetermined locations in memory of the first T-carrier based upon address data for the exchanged information provided within a channel-exchange list relating at least some channels of the first T-carrier to at least some other channels of the second T-carrier;
   a mask register for determining whether the exchanged information in each successive slot should be compressed or decompressed based upon a status of specific bit locations of the respective address data for the exchanged information;
   an encoder adapted to compress the information from successive slots of the first T-carrier when required by the mask register; and;
   an decoder adapted to decompress the information from successive slots of the first T-carrier when required by the mask register,
   wherein the encoder compresses and saves the information under both compressed and uncompressed formats and the mask register selects one of the compressed and uncompressed formats based upon the status of the specific bit locations,
   and wherein the decoder decompresses the information and overwrites corresponding predetermined memory locations when the status of the specific bit locations indicate that the corresponding predetermined memory locations contain compressed data.

35. The apparatus for exchanging information as in claim 34 wherein the first address controller further comprises a first counter adapted to be incremented synchronously with slot progression of the first T-carrier.

36. The apparatus for exchanging information as in claim 35 further comprising a synchronization reset adapted to reset the first counter upon detecting a first slot of a repeating multi-frame of the first T-carrier.

37. The apparatus for exchanging information as in claim 35 further comprising a lookup table adapted to provide a channel-exchange list.

38. The apparatus for exchanging information as in claim 37 wherein the second address controller further comprises a second counter coincident adapted to be incremented in synchronism with a slot progression of the second T-carrier.

39. The apparatus for exchanging information as in claim 38 further comprising a reset controller adapted to reset the second counter upon detecting a first slot of a repeating multi-frame of the second T-carrier.

40. The apparatus for exchanging information as in claim 38 further comprising an adder adapted to determine the predetermined memory locations of the first T-carrier by adding an output of the second counter to a base memory address of the lookup table.

41. The apparatus for exchanging information as in claim 40 further comprising a memory controller adapted to retrieve a predetermined memory location of the predetermined memory locations of the first T-carrier from a lookup table memory address determined by adding the output of the second counter and the base memory address of the lookup table.

42. The apparatus for exchanging information as in claim 34 wherein the first T-carrier further comprises a plurality of T-carriers.

43. The apparatus for exchanging information as in claim 34 further comprising a multiplexer adapted to multiplex information between the predetermined locations of the first T-carriers and the second T-carrier.

44. A method of exchanging information between a first plurality of T-carriers and a second T-carrier coupled to a T-carrier interface device, such method comprising the steps of:
   exchanging information between successive slots of the plurality of T-carriers and a respective predetermined memory location within a memory device;
   exchanging information between successive slots of the T-carrier interface device and at least some of the predetermined locations in memory of each of the plurality of T-carrier channels based upon address data for the exchanged information provided within a channel-exchange list; and
   determining whether the exchanged information should be compressed or decompressed based upon a status of specific bit locations of the respective address data for the exchanged information;
   compressing or decompressing at least some of the information exchanged between the first plurality of T-carriers and respective predetermined memory locations within the memory device based upon the address data for the exchanged information,
   wherein the step of determining whether the exchanged information should be compressed or decompressed further comprises compressing and saving the information under both compressed and uncompressed formats and selecting one of the compressed and uncompressed formats based upon the status of the specific bit locations,
   and wherein the step of determining whether the exchanged data should be decompressed or decompressed further comprises decompressing the information and overwriting corresponding predetermined memory locations when the status of the specific bit locations indicates that the corresponding predetermined memory locations contain compressed data.

45. The method of exchanging information as in claim 44 further comprising compressing at least some of the information exchanged between the first plurality of T-carriers and respective predetermined memory locations within the memory device.

46. The method of exchanging information as in claim 44 wherein the step of exchanging compressed information between the successive slots of the T-carrier interface device and the predetermined channel locations in memory further comprising selecting a slot of the T-carrier interface device and locating the respective predetermined channel locations of the memory device.

47. The method of exchanging information as in claim 46 wherein the step of locating the respective predetermined channel locations of the memory device further comprises entering a lookup table using an identifier of the selected slot of the T-carrier interface device as an index into the lookup table and retrieving an identifier of a corresponding memory location.

48. The method of exchanging information as in claim 47 wherein the step of retrieving a corresponding memory location further comprises selecting a memory device of a plurality of memory devices.

49. The method of exchanging information as in claim 48 wherein the step of selecting a memory device further comprises retrieving an identifier of the memory device of a plurality of memory devices.

50. The method of exchanging information as in claim 49 wherein the step of selecting a memory device further comprises routing a contents of the corresponding memory location from the identified memory device to the T-carrier interface device through a multiplexer.

51. The method of exchanging information as in claim 50 wherein the step of exchanging information between each slot of the plurality of T-carrier channels and the respective predetermined memory location within the memory device further comprises performing a serial to parallel conversion.

52. The method of exchanging information as in claim 51 wherein the step of exchanging information between successive slots of the T-carrier interface device and the predetermined locations in memory of each of the plurality of T-carrier channels further comprises performing a parallel to serial conversion.

* * * * *